Oct. 6, 1959     R. O. CHAKROFF     2,907,242
POWER-OPERATED GEAR-DRIVEN PIPE OR TUBE COUPLING DEVICE
Filed May 12, 1958     3 Sheets-Sheet 1

INVENTOR;
RICHARD O. CHAKROFF,
BY CORBETT, MAHONEY,
MILLER & RAMBO,
ATTORNEYS

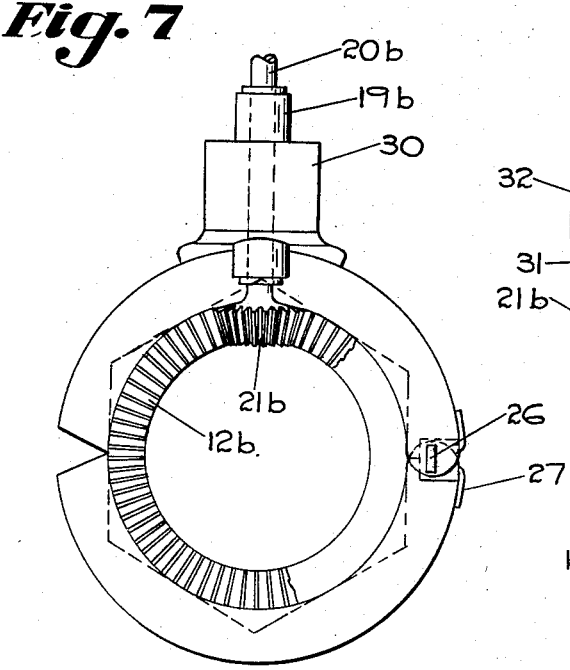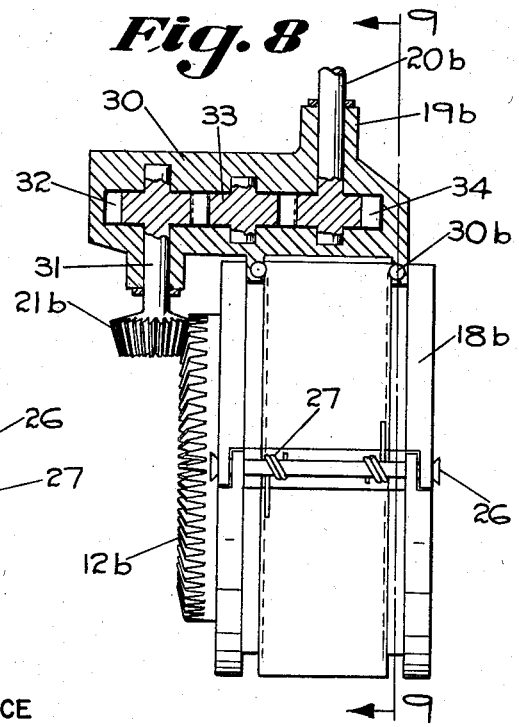

United States Patent Office 2,907,242
Patented Oct. 6, 1959

2,907,242

POWER-OPERATED, GEAR-DRIVEN PIPE OR TUBE COUPLING DEVICE

Richard O. Chakroff, Worthington, Ohio

Application May 12, 1958, Serial No. 734,547

5 Claims. (Cl. 81—57)

My invention relates to a power-operated, gear-driven pipe or tube coupling device. It has to do, more particularly, with a coupling rotating device which can be moved into and out of engagement with the coupling in a direction radially thereof and which will extend outwardly of the coupling to a suitable operating point. It is particularly useful with couplings of the type generally used in connecting the adjacent ends of tubing in axial alignment and which usually consist of a rotatable nut or collar threaded on the end of one section of the tubing and a sealing collar carried on the adjacent flared end of the other section of the tubing and adapted to be forced against such end of the tubing by rotation of the threaded collar which engages the sealing collar.

It is common to use tubing of this type in large banks or groups in which the tubes extend in the same general direction and are disposed closely adjacent each other. In such installations, due to the limited lateral spacing of the tubing, it is very difficult and sometimes even impossible to insert a spanner wrench or similar wrench between adjacent tubes and properly oscillate it in order to actuate couplings thereon to disconnect or reconnect selected tubes. My invention provides a coupling rotating device which can be slipped on or off the coupling by a movement radially thereof and which is provided with means for rotating the coupling merely by a simple rotating or driving member which can extend outwardly to an operating point which may be a remote location if necessary. My device can not only be readily positioned on a coupling in a laterally confined space but can be operated by a simple rotative action which can be produced by power driven tools that may include torque limiting means.

In one form of my invention, the coupling nut or collar includes a surrounding annular gear by means of which it may be rotated. The rotating device comprises positioning means for embracing the coupling and supporting a rotatable driving member. This driving member is provided with driving means, in the form of a pinion or worm, which is maintained in proper engagement with the annular gear when the coupling rotating device is supported on the coupling. In another form of my invention, the coupling itself is not provided with the annular gear but a suitable adaptor is provided which can be slipped radially on and off the coupling and which carries the annular gear that is driven by driving means also carried by the adaptor.

In the accompanying drawings I have illustrated examples of my invention but it is to be understood that specific details thereof may be varied without departing from the basic concepts of this invention.

In these drawings:

Figure 7 is an elevational view showing another form of coupling rotating device according to my invention.

Figure 8 is an edge elevational view, partly in section, of the device of Figure 7.

Figure 9 is a transverse sectional view taken along line 9—9 of Figure 8 and showing this form of my device on a coupling.

Figure 1:
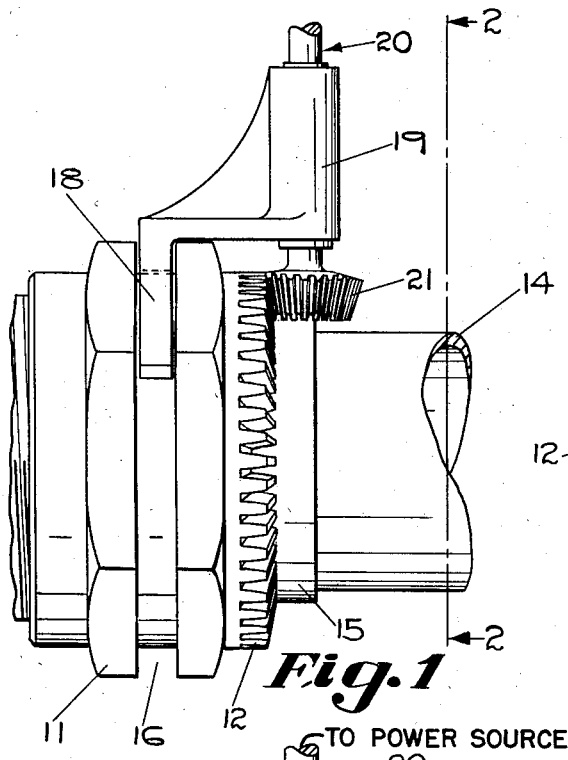
Figure 1 is a side elevational view illustrating coupling connected tube sections and showing one form of my coupling rotating device engaging the coupling.
Figure 2:
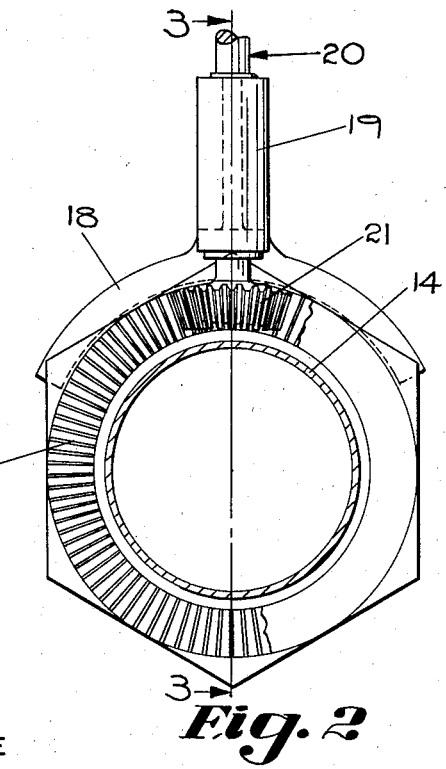
Figure 2 is a transverse sectional view taken along line 2—2 of Figure 1 through one of the sections.
Figure 3:
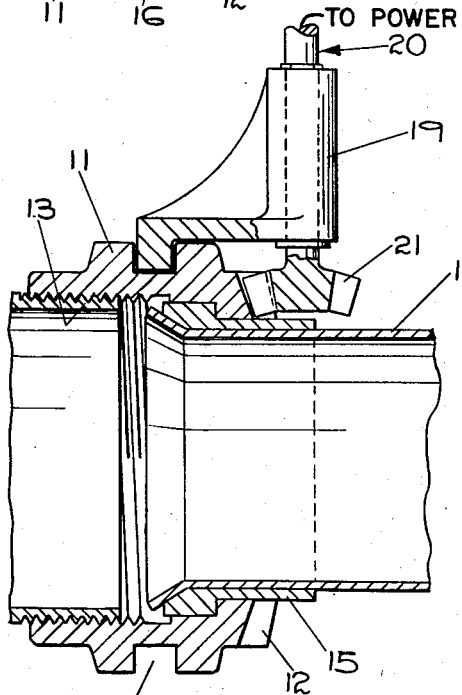
Figure 3 is an axial sectional view taken along line 3—3 of Figure 2.
Figure 4:
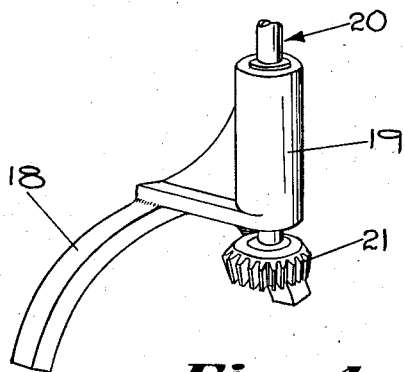
Figure 4 is a perspective view of my coupling rotating device off the coupling.

With reference to the drawings and particularly to Figures 1 to 4, inclusive, I have illustrated one form of my coupling rotating device. In this form of my invention, the coupling itself is provided with an annular gear which is to be driven by the rotating device. Thus, in Figures 1 to 3, I have illustrated the coupling collar or nut 11 as being provided with an annular bevel gear 12 at one edge thereof. The other edge of the nut 11 is threaded on one section 13 of tubing. The other section 14 of tubing is flared and is provided with the gland or sealing collar 15 which is engaged by the nut 11 in the usual manner. The nut 11 is further provided with an annular outwardly opening groove 16 in its circumference. With this arrangement, the coupling nut 11 will couple the tube sections 13 and 14 and will be provided with the gear 12 by means of which it may be rotated in coupling and uncoupling the tube sections.

The coupling rotating device is adapted to be supported in association with the nut 11 when the nut is to be rotated in the coupling or uncoupling operation. This device comprises positioning means in the form of a supporting yoke 18 which will embrace the nut 11 when positioned in the groove 16 in straddling relationship to the nut. This member 18 carries a bearing sleeve 19, the axis of which is substantially parallel to the plane of the yoke 18. This bearing sleeve 19 rotatably supports a shaft 20 which is axially fixed therein. This shaft 20 may be of suitable length and may be of the flexible type. The end of the shaft at the sleeve 19 projects from the sleeve and carries the bevel pinion 21 which is keyed thereon and which is adapted to mesh with the coupling gear 12.

To position the coupling rotating device on the coupling nut 11 it is merely necessary to slip it radially inwardly to cause the yoke 18 to be positioned in the groove 16 of the nut. At the same time, the bevel pinion 21 is engaged with the bevel gear 12 by this radial inward movement. The sides of the yoke 18 are flat and since the yoke is in the groove 16, axial movement of the rotating device relative to the coupling nut 11 will be prevented and the pinion 21 will be maintained in firm meshing engagement with the gear 12. The shaft 20 will extend radially from the coupling and can be easily rotated by suitable means, such as by a power driven rotary hand tool. The nut 11 will rotate relative to the yoke 18 which is engaging the annular bearing surface formed by the groove 16. When the nut 11 has been rotated sufficiently to tighten or loosen it, the rotating device may be easily removed merely by slipping it radially outwardly off the coupling.

Figure 5:
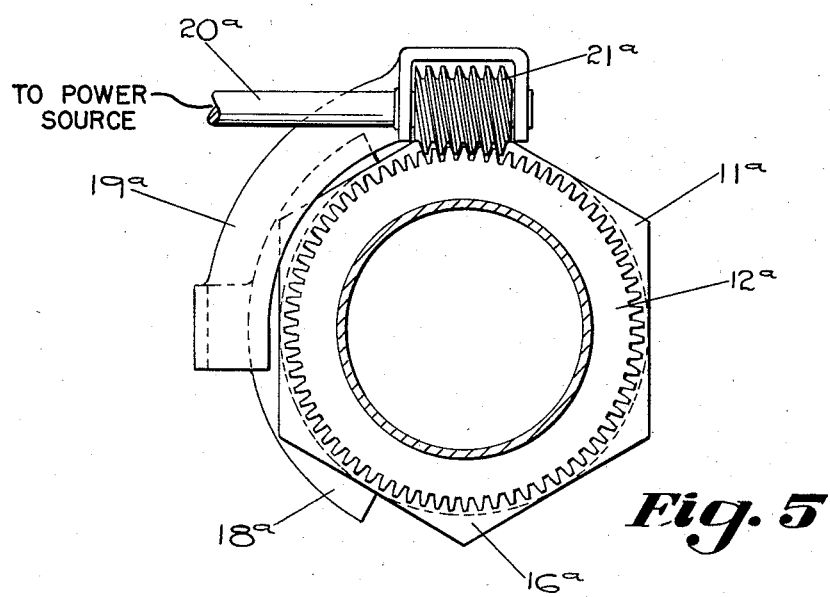
Figure 5 is a transverse sectional view showing a different type of coupling rotating device according to my invention positioned on a coupling.
Figure 6:
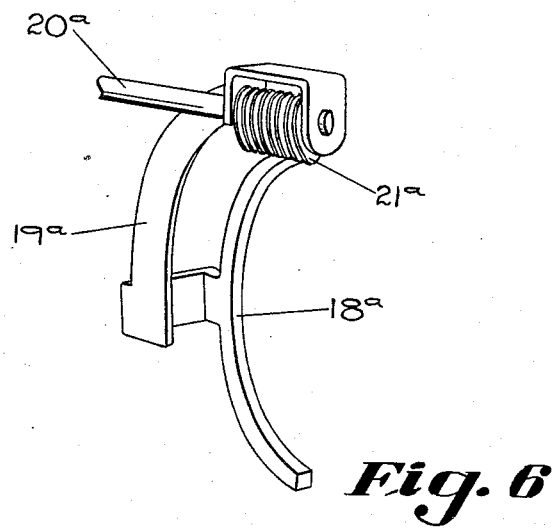
Figure 6 is a perspective view of the device shown in Figure 5.

In Figures 5 and 6, I have shown a somewhat different arrangement of my device. In this instance, the gear 12a on the coupling nut 11a is a worm gear. The driving means for the worm gear 12a comprises a worm 21a. This worm 21a is on the end of a shaft 20a which is supported for rotative movement but is precluded from axial movement in a supporting bracket 19a. This supporting bracket 19a includes a yoke 18a which is adapted to be positioned in an annular groove 16a formed in the periphery of the nut 11a.

In positioning this coupling rotating device on the coupling nut 11a, the device is moved radially inwardly until the yoke 18a is positioned in the groove 16a as shown in Figure 5. In this instance, the yoke 18a engages only the outer side of the nut 11a. During the inward radial movement, the worm 21a is rotated in the proper direction to cause it to properly engage and mesh with the worm gear 12a. As the worm 21a is engaged with the gear 12a, the yoke 18a will be drawn into tight engagement with the bottom of the groove 16a. In rotating the shaft 20a in a reverse direction, there will be a tendency to move the yoke 18a radially outwardly of the groove 16a. However, this tendency can be overcome by a slight inward axial pressure on the shaft 20a. In this example, the shaft 20a is disposed tangentially of the coupling and gear 12a, as indicated.

In Figures 7, 8, and 9, I have illustrated another form of my invention in which an adaptor 18b is provided for fitting over the ordinary hex nut 11b of the coupling. The adaptor is in the form of a split ring having the half-sections 25 that are pivoted together at one side, by a pivot pin 26, a spring 27 being associated with the pivot pin to yieldingly hold the sections 25 together at the diverging meeting ends 28 diametrically opposite the pivot 26. Within the ring sections 25 the hex socket 29 is formed for fitting closely the nut 11b. Carried by one of the ring sections 25 is a bearing 19b which extends radially from the ring section 25 and which has the driving shaft 20b mounted therein for rotation without axial movement. The bearing sleeve 19b is carried by a bracket 30 which extends in parallel relationship to the axis of the adaptor 18b and beyond one edge thereof. This bracket 30 is rotatably mounted on the ring sections 25 by means of a ball bearing structure 30b. This structure permits revolving of the entire adaptor ring structure 18b relative to the bracket 30.

The bracket 30 carries a radially inwardly extending shaft 31 on its outer end which is parallel to the axis of the bearing sleeve 19b. On the inner end of this shaft, a pinion 21b is keyed and meshes with a ring gear 12b half-sections of which are formed on the two half ring sections 25 of the member 18b. One end of the shaft 31 is disposed within the bracket 30 and has the pinion 32 keyed thereon which meshes with an idler pinion 33 that, in turn, meshes with a pinion 34 keyed on the inner end of the shaft 20b. The pinions 32, 33, and 34 are rotatably disposed within the bracket 30, as shown in Figure 8.

It will be apparent that with this arrangement, the adaptor 18b can be slipped inwardly over the nut 11b, the diverging ends 28 facilitating the spreading of the ring sections 25 for this purpose. When the adaptor 18b passes inwardly sufficiently, it will snap around the nut 11b and remain in place. The pinion 21b will always be in engagement with the gear 12b and the entire adaptor 18b will be free to revolve on the bracket 30. Axial movement of the adaptor 18b relative to the nut 11b will be precluded by the socket 29 which will have its walls overlapping the ends of the hex part of the nut 11b.

It will be apparent from the above description that I have provided a coupling rotation device which can be applied to the coupling or be removed therefrom from a position at right angles to the axis of the coupling and tubes which it connects. The device can be easily applied to or removed from the coupling and there will be no danger of it accidentally slipping from the coupling when applied thereto. The coupling can thus be rotated by means of a continuous rotative movement applied to the driving shaft which can extend outwardly to a suitable location. This may even be a remote location and the shaft can be driven by a power rotated tool.

In all forms of my invention, the coupling or other rotative member is rotated relative to the axially extending member on which it is supported by means of a shaft which is mounted for rotative but non-axial movement and extends outwardly of the coupling and is geared to the coupling to drive it. In each form of the invention the axis of the drive shaft extends outwardly relative to the coupling in a transverse plane which is at right angles to the axis of the tube.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A device for rotating a coupling or the like and comprising an external gear operatively connected to the coupling and adapted to be driven for rotating the coupling, said coupling being rotatively mounted on a member to be coupled to a similar member with the axis of the coupling and the member on which it is rotatively mounted coaxial and with said external gear coaxial, a drive shaft supporting structure, means for operatively connecting said supporting structure to said coupling, said means comprising interfitting connecting portions which permit rotation of said coupling relative to the supporting structure but prevent axial movement of said supporting structure relative to said coupling, a drive shaft supporting bearing on said supporting structure radially outwardly of said coupling with its axis extending outwardly relative to the axis of said external gear and coupling in a transverse plane which is normal to the axis of said coupling, a drive shaft rotatably mounted in said bearing, and a driving gear keyed on said shaft and engaging said external gear so that upon rotation of said drive shaft said external gear is driven to rotate said coupling.

2. The combination of claim 1 in which said interfitting connecting portions comprise a yoke on said supporting structure embracing the coupling and being positioned in a groove in the circumference thereof for relative rotation but non-axial movement relative thereto.

3. The combination of claim 1 in which the gear is formed on the coupling.

4. The combination of claim 1 in which the supporting structure comprises a bracket and an adaptor which non-rotatably embraces the coupling and which are connected together by said interfitting portions to permit revolving movement of the adaptor relative to the supporting structure.

5. The combination of claim 4 in which the gear is carried on the adaptor, and the adaptor is in the form of a split ring which non-rotatably embraces the coupling.

References Cited in the file of this patent

UNITED STATES PATENTS

| 1,736,149 | Dunmire | Nov. 19, 1929 |
| 2,067,773 | Long | Jan. 12, 1937 |
| 2,795,985 | Wilson | June 18, 1957 |

FOREIGN PATENTS

| 688,061 | France | May 6, 1930 |
| 707,988 | Great Britain | Apr. 28, 1954 |